Figure 1:
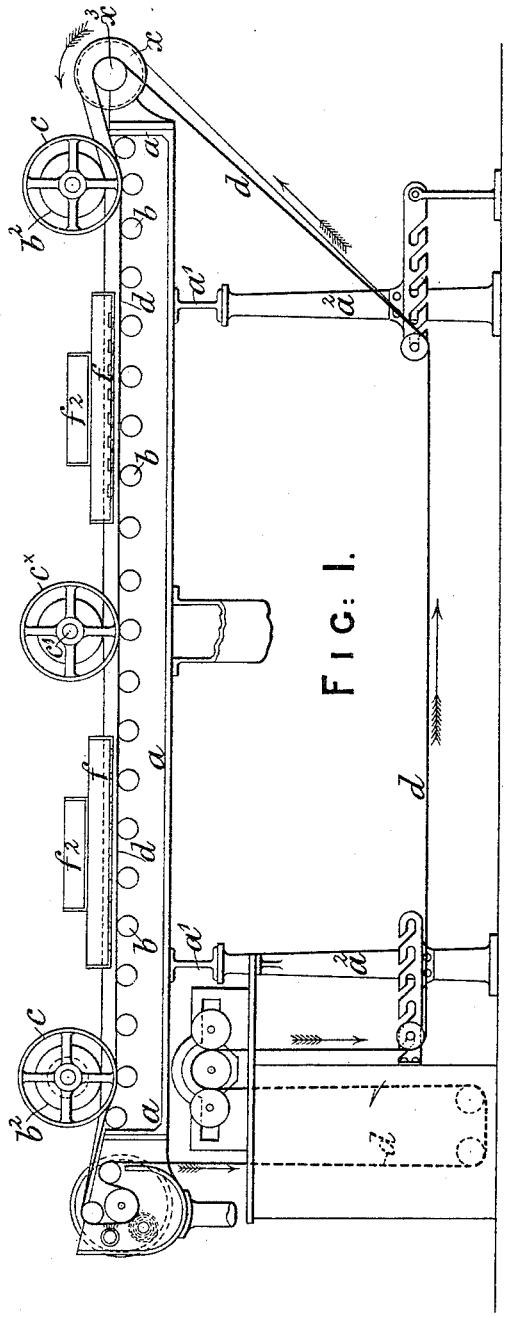

(No Model.) 4 Sheets—Sheet 1.

E. MARTIN.
FILTERING MACHINERY.

No. 453,815. Patented June 9, 1891.

Witnesses:
Henry Huber
W. Reimler

Inventor
Edgar Martin
by Joques & Ragener
Attorneys.

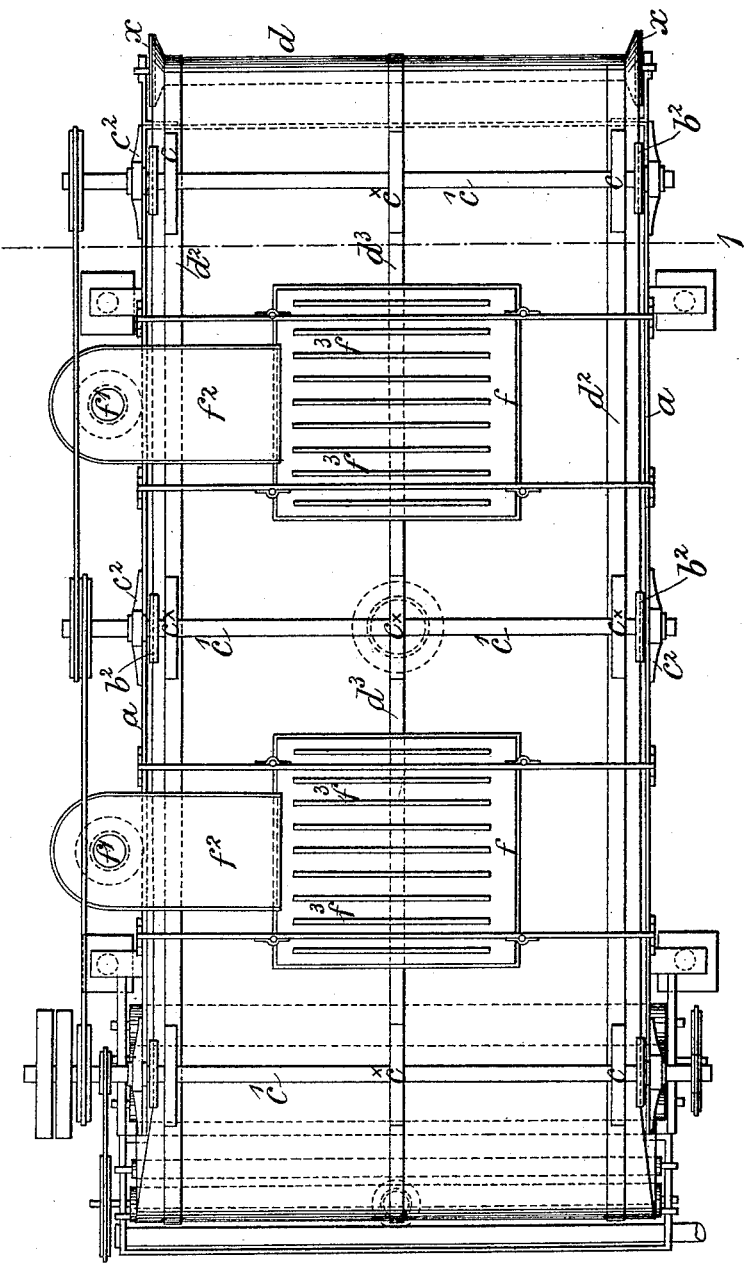

(No Model.) 4 Sheets—Sheet 3.
E. MARTIN.
FILTERING MACHINERY.
No. 453,815. Patented June 9, 1891.
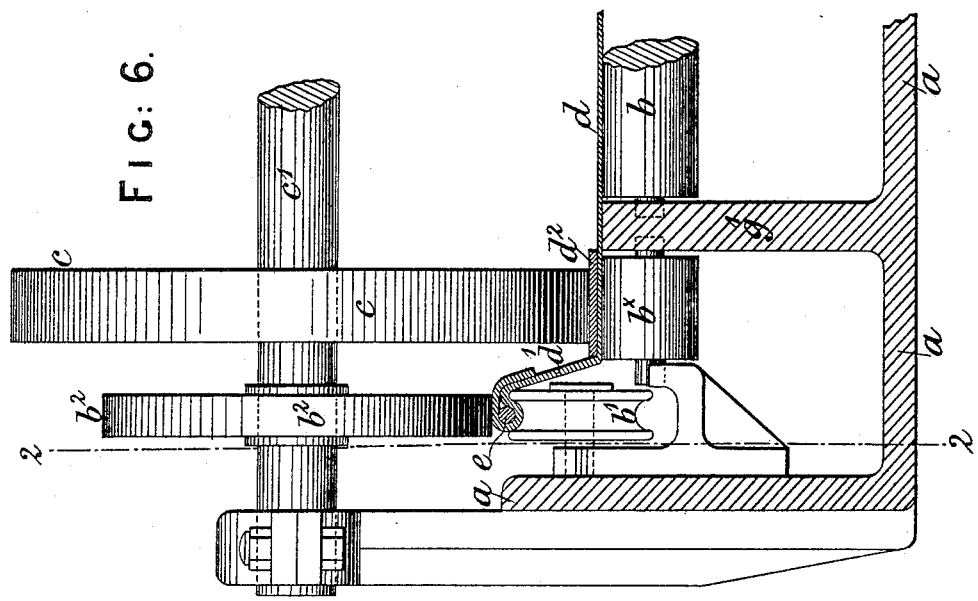
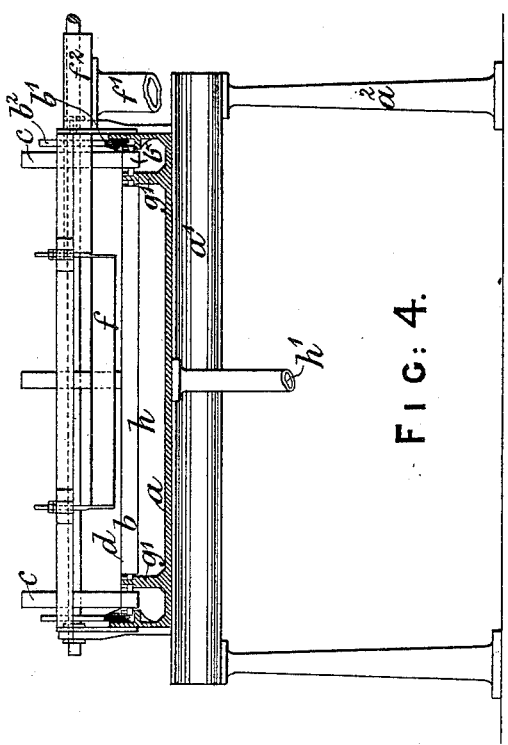
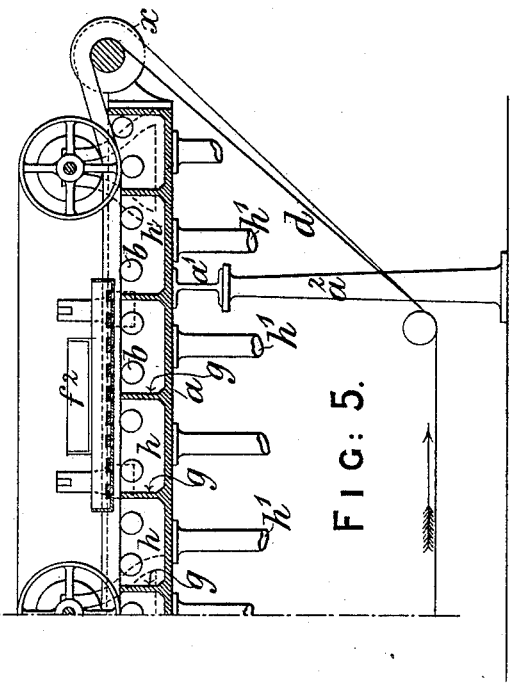

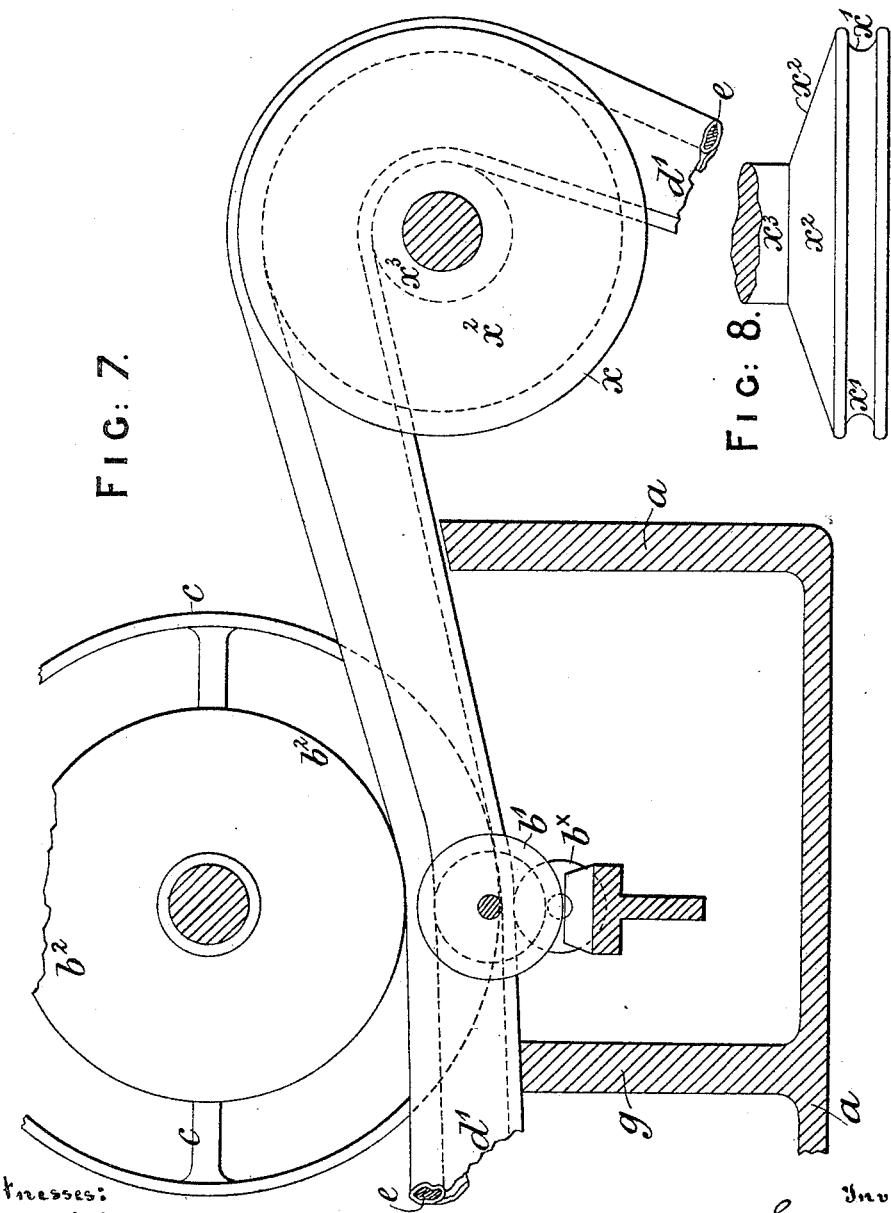

UNITED STATES PATENT OFFICE.

EDGAR MARTIN, OF HAMPER MILLS, NEAR WATFORD, ENGLAND.

FILTERING MACHINERY.

SPECIFICATION forming part of Letters Patent No. 453,815, dated June 9, 1891.

Application filed November 4, 1890. Serial No. 370,259. (No model.) Patented in England May 12, 1890, No. 7,361.

*To all whom it may concern:*

Be it known that I, EDGAR MARTIN, paper-maker, of Hamper Mills, near Watford, Herts, England, a subject of the Queen of Great Britain, have invented certain new and useful Improvements in Filtering Machinery, (for which I have made application for Letters Patent in Great Britain, No. 7,361, dated May 12, 1890,) of which the following is a specification.

This invention has for its object the filtering of water by means of a traveling endless band of any material suitable for a filtering medium, either separate or combined with other materials, and which is so arranged that a portion of its length is made to assume the form of an open shallow cistern. For this purpose the said endless band is so arranged and mounted that as it travels it is caused at a certain point to make a slight descent, and the two sides or edges are caused to turn up. A portion of the length of the said band extends horizontally in this form and is then caused to rise, spread out, and become flat. In this manner a shallow cistern is formed for receiving therein the water to be filtered. The endless band may be strengthened and supported by traveling belts or in any other suitable manner. The liquid to be filtered flows on the upper surface of that portion of the endless band which has thus been made to assume the form of a shallow open cistern, filters through it, is collected underneath, and conducted where required. The said endless band may be always traveling and the speed so regulated that during the time it is passing over the distance where it assumes the form of a cistern and acts as a filter it will become coated with matter (if any) arrested from the liquid which has just been filtered. Continuing to travel, the said endless band is conducted through a cleansing apparatus and returns clean and again ready for filtering to that point where it was first made to assume the form of a cistern and act as a filter. Thus the entire length of the endless band takes its turn (part at a time) in assuming the form of an open shallow cistern, acting as a filter, and thereafter passing through the cleansing apparatus, so that the processes of filtering and cleaning proceed without interruption, or filtering and cleaning may be conducted intermittently, if desired. This arrangement may be used for upward filtration, if desired.

Vacuum-boxes (such as those used on the well-known continuous paper-making machines) or other equivalent or suitable devices may, if desired, be used to accelerate the filtration—that is, to draw the water through the endless band of filtering material.

In carrying out this invention I employ an open shallow cistern, tank, or vessel, which may be made of iron or any substantial material and of square, rectangular, or other suitable form. The upper part of this fixed cistern is arranged to receive a series of rollers or any suitable support for that portion of the endless band of filtering material which acts as a filter and allows the same to travel, and near or upon the top of the said cistern there are fitted certain small rollers, pulleys, or other arrangements for receiving the two turned-up edges of said filtering material and allowing and assisting same to travel also. In order to strengthen the said endless band of filtering material and facilitate its traveling, a small wire cord or tape may be attached to each of the two extreme edges of the entire length of the said endless band, and the small rollers or pulleys last referred to may be grooved or otherwise formed on the periphery for receiving and guiding the said wire cord or tape and along each side of the said endless band, and close to that part which turns up there may be fastened a strip of cotton belting, woven wire, or any pliable material, and similar strips may be fastened to the said endless band parallel with the edges at suitable distances from each other and continued the length of the endless band for the purpose of strengthening the same when the width is considerable.

In order that my present invention may be easily understood and readily carried into practice, I will proceed to more fully describe the same with reference to the drawings hereunto annexed.

Figure 2:
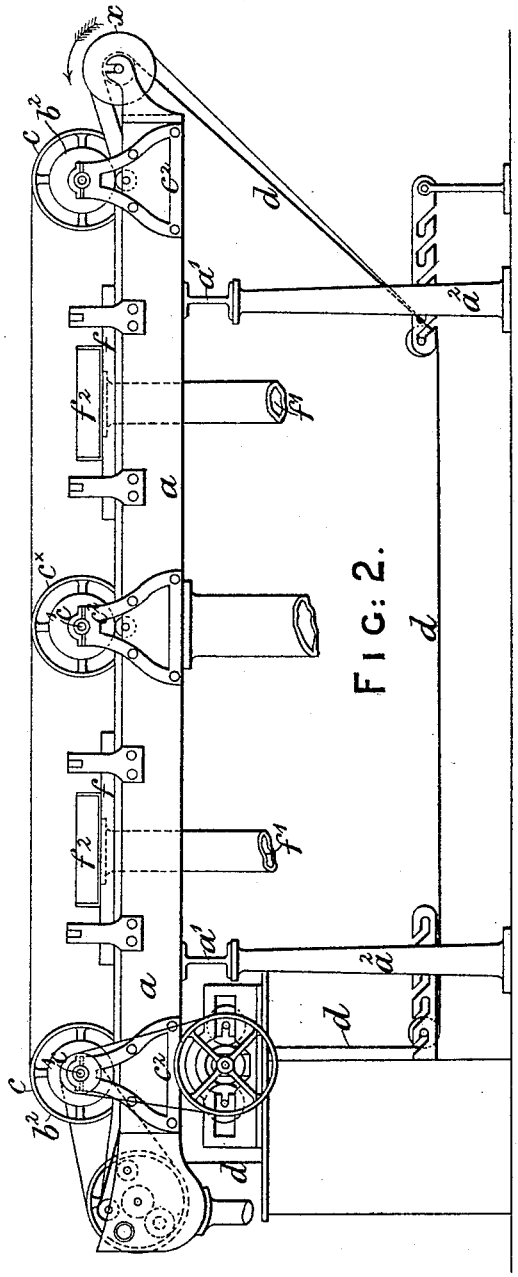

In the drawings, Figure 1 is a longitudinal sectional elevation of apparatus arranged and acting in accordance with my present invention. Fig. 2 is a longitudinal elevation of same machine. Fig. 3 is a plan of Figs. 1 and 2. Fig. 4 is a cross-section of the apparatus on line 1 1, Fig. 3, but with the addition of the "vacuum-boxes" hereinafter described. Fig. 5 is a part side sectional elevation showing the vacuum-boxes applied. Figs. 6, 7, and 8 are enlarged detail views of particular parts, Fig. 6 being a local enlarged view of the rollers $b$, $b^\times$, $b'$, and $b^2$ and the pulley $c$. Fig. 7 is a side view taken on the line 2 2 of Fig. 6 to show how each edge of the endless band of filtering material is turned up as it enters the machine to form the shallow cistern or hollow to receive the water to be filtered. Fig. 8 is an edge view of the wheel or pulley $x$, which assists to so turn up the said edge.

$a$ is an open cistern, tank, or vessel (of wood or metal or any other suitable material) supported on girders $a'$, which rest on columns $a^2$. A series of rollers $b$ extends across the cistern $a$ for the purpose of supporting the band of filtering material, and along the top edge of each side of the cistern there are small rollers or pulleys $b'$ for receiving the two edges of the filtering material. The pulley $c$ $c$ are mounted on shaft $c'$, supported by brackets $c^2$, bolted to the side of the cistern $a$. These pulleys $c$ press the endless band onto the underneath rollers $b$ $b$, or where vacuum-boxes are used then these drums or rollers $c$ press the endless band of filtering material onto independent small rollers $b^\times$. (See Fig. 6.) Another pulley or roller $b^2$ presses on the small roller or pulley $b'$.

$d$ $d$ is the endless band of filtering material, having attached at each edge $d'$ $d'$ a flexible wire cord, tape, or any strong pliable material $e$, and at $d^2$ there is a strip of pliable material, such as cotton belting or woven wire. The endless band of filtering material enters the cistern, say, at the right-hand end, (in the direction shown by the arrows, Figs. 1 and 2,) and passes between the pulleys $c$ $c$ and the rollers $b$ $b$, while the top edges $d'$, with flexible wire cord $e$ therein, travel along between the rollers $b'$ $b'$ and $b^2$ $b^2$. The strips $d^2$ $d^2$ are of too close a texture to allow water to filter through, and therefore the impurities of the water are not pressed through the filtering material into the lower part of the cistern when passing between the said pulleys and rollers. In some cases the strip may, if desired, be of sufficient width to extend up the side and have the wire or cord attached to the top of it.

$d^3$ $d^3$ is an additional strengthening-strip clipped between additional drums or pulleys $c^\times$ and the rollers $b$. Such additional strips and additional pulleys may be employed to any extent found necessary, according to the size of the filter.

$x$ is the wheel or drum, one of which is mounted each side at the front of the machine to assist to turn up the edge $d'$ of the endless band $d$. A groove $x'$ is formed on the outer edge of $x$, in which groove $x'$ the wire cord $e$ on the edge $d'$ lies, while the inner face $x^2$ of each such drum $x$ slants toward the other. (See Fig. 3 and also Fig. 8.) Thus as the endless band $d$ returns from the cleaning apparatus and rises up (when it is returned underneath) to the front end of the tank or cistern $a$ the extreme edge thereof, containing the wire cord $e$, is guided into the groove $x'$, while the edge $d'$ lies closely against the face $x^2$ of the drum $x$, and the middle part of the band $d$ lies against the roller $x^3$, and in this manner or in any other equivalent or suitable manner the edge at each side of the endless band $d$ is turned up. At the opposite end there are suitable drums or pulleys and rollers where the endless band of filtering material is caused to rise a little and then spread out flat. The endless band $d$ in such flat state is then brushed and passed between rollers, as illustrated in Figs. 1 and 2 of the drawings, or it may be cleaned or treated in any other convenient or suitable manner and thereafter steamed, if desired. Such steaming will be found to be a great advantage, as it not only destroys all organic matter, thus purifying the filtering material, but tends to preserve the latter.

The steaming may be effected (as often as required—say once or twice a week) in any suitable manner, and this can easily be effected at some convenient point of its travel; but I make no claim to such steaming, inasmuch as I am fully aware that steam has already been applied in other forms of filtering apparatus.

The pulleys $c$ and $c^\times$ are arranged so that they press upon the filtering material where it has been strengthened in the manner already described. There may be more than two pulleys $c$ upon each shaft $c'$, extending across the face of the endless band $d$, so as to press upon and grip said endless band $d$ wherever strips of strengthening material such as $d^3$ have been attached to it.

The speed at which the filtering material travels is intended to be regulated according to the impurity in the liquid to be filtered, so that while traveling from one end of the shallow cistern $a$ to the other it becomes more or less coated or choked with matter arrested, and therefore useless for filtering until it has been cleaned.

The liquid to be filtered should not be allowed to fall upon the face of the filtering material in a heavy stream, lest the impurities be driven through the material instead of remaining in same or on the surface thereof. To avoid this a "distributer" may be employed, consisting of a shallow cistern or tray $f$, fixed immediately above the filtering material and supplied from the water-supply pipe $f'$ down a channel $f^2$. In the bottom of the said tray $f$ there is a series of very narrow slits $f^3$. The liquid to be filtered is delivered into this tray $f$ and escapes through the narrow slits $f^3$ and falls on the filtering material in a series of small streams. Should large particles of suspended matter tend to choke the slits $f^3$, they are readily cleared by drawing a brush or scraper over them. In the case of river-water largely charged with floating pieces such pieces would be arrested by the distributer and can be removed automatically by a traveling brush or scraper or in any other suitable way.

For filtering muddy water such as is frequently obtained from rivers and streams this form of filter is particularly well adapted. According to the finely-divided state of the matter in suspension in the water to be filtered, the filtering material can be of any degree of fineness that may be found necessary to arrest it. The result will be that the filtering material will choke very rapidly; but this is readily counteracted by causing the filtering material to travel faster, with the result that every part is more frequently cleaned.

The before-mentioned vacuum-boxes are arranged and act as follows, (see Figs. 4, 5, 6, and 7:) Division-pieces $g$ $g'$ are placed in the cistern or tank $a$, the bottom of such division-pieces $g$ $g'$ resting upon the bottom of the cistern $a$, while the top face comes in close contact with the filtering material $d$, which will consequently, while traveling, touch upon the top of such division-pieces $g$ $g'$. By providing each division $h$ with a separate outlook $h'$ underneath and either attaching such outlet to a pump or conducting the said outlet-pipe $h'$ downward and giving it a considerable fall—say five to ten feet—a partial vacuum can be obtained, which will draw the water through the filtering material $d$ with a similar effect as though there were a corresponding head of water above it. By such an arrangement I have estimated that very muddy river-water may be passed through the endless band of filtering material at a rate of more than one hundred gallons per square foot per hour, and the resulting filtered water will be bright and of better quality than can be obtained from ordinary sand-beds filtering at their usual speed of two and one-half to three gallons per square foot per hour.

The aforesaid vacuum-boxes may or may not be used for other descriptions of water, whether of a more or less impure state.

Having now particularly described and ascertained the nature of my said invention and in what manner the same is to be performed, I would remark that I am aware that in machinery for filtering water it has been proposed to use a traveling endless band of filtering material which is caused to descend at one part of its travel and again ascend farther on its travel; but this band has been used flat, and I make no claim thereto whatever; but What I do claim is—

1. In a filtering-machine, the combination, with a traveling band of filtering material, of means for depressing parts of said band to form a pocket, and means for raising the edges of the band at the sides of said depressed part to form side walls for said pocket, substantially as set forth.

2. In a filtering-machine, the combination, with a traveling band of filtering material, of rollers for pressing the band upon the supporting-rollers near the side edges, supporting-rollers for the side edges, which latter rollers are higher than the main body of the belt, and rollers for pressing the side edges upon said side-edge-supporting rollers, substantially as set forth.

3. In a filtering-machine, the combination, with a band of filtering material, of a wire or cord secured to the side edge of the same, grooved supporting-rolls for said side edges, supporting-rolls for the band, located lower than said grooved rolls, and rollers for pressing the wire or cord upon the grooved rolls and the band upon the lower supporting-rolls, substantially as set forth.

4. In a filtering-machine, the combination, with a band of filtering material, of rollers for supporting the same, a strip of belting or woven wire secured on said band of filtering material near the side edges, rolls for supporting the filtering-band, rollers above the strip of belting or woven wire and pressing the same downward for the purpose of pressing the band on its supporting-rolls, a wire or cord in the side edge of the filtering-belt, grooved rollers for supporting said wire or cord, which rollers are located higher than the supporting-rollers for the filtering-band, and rollers for pressing said wire or cord upon the grooved rollers, substantially as set forth.

EDGAR MARTIN.

Witnesses:
WALTER GEO. ALKINS,
JOHN G. TONGUE.